(12) United States Patent
Chen

(10) Patent No.: US 12,645,801 B2
(45) Date of Patent: Jun. 2, 2026

(54) FIRMWARE UPDATE METHOD AND SYSTEM

(71) Applicant: ADLINK TECHNOLOGY INC., Taoyuan City (TW)

(72) Inventor: Chun-Liang Chen, Taoyuan City (TW)

(73) Assignee: ADLINK TECHNOLOGY INC., Taoyuan City (TW)

( * ) Notice: Subject to any disclaimer, the term of this patent is extended or adjusted under 35 U.S.C. 154(b) by 197 days.

(21) Appl. No.: 18/645,196

(22) Filed: Apr. 24, 2024

(65) Prior Publication Data

US 2025/0291925 A1      Sep. 18, 2025

(30) Foreign Application Priority Data

Mar. 13, 2024     (TW) ................................. 113109216

(51) Int. Cl.
G06F 21/57        (2013.01)
G06F 21/60        (2013.01)
G06F 21/64        (2013.01)

(52) U.S. Cl.
CPC .......... G06F 21/572 (2013.01); G06F 21/602 (2013.01); G06F 21/64 (2013.01)

(58) Field of Classification Search
CPC ....... G06F 21/572; G06F 21/602; G06F 21/64
See application file for complete search history.

(56) References Cited

U.S. PATENT DOCUMENTS

| | | | |
|---|---|---|---|
| 10,923,211 B1* | 2/2021 | Eisenhuth | ........... G06F 9/30029 |
| 2002/0138732 A1* | 9/2002 | Irvin | ..................... H04L 9/3247 |
| | | | 713/180 |
| 2003/0009271 A1 | 1/2003 | Akiyama | |

(Continued)

FOREIGN PATENT DOCUMENTS

| | | |
|---|---|---|
| TW | 201224752 A | 6/2012 |
| TW | 201706899 A | 2/2017 |

(Continued)

OTHER PUBLICATIONS

TW Office Action dated Mar. 19, 2026 in application No. 113109216.

*Primary Examiner* — Shin-Hon (Eric) Chen
*Assistant Examiner* — Ethan V Vo
(74) *Attorney, Agent, or Firm* — Maschoff Brennan

(57)        ABSTRACT

A firmware update method includes: using, a first deterministic random bit generator to obtain a first key and a first verification code by a first computing device; using the first key to encrypt first firmware update data and the first verification code to output first encrypted data by the first computing device; receiving second encrypted data by a second computing device; using a second deterministic random bit generator to obtain a second key and a second verification code by the second computing device; using the second key to decrypt the second encrypted data to obtain a third verification code and second firmware update data by the second computing device; and updating a firmware of the second computing device when determining the second verification code matches the third verification code by the second computing device. The second deterministic random bit generator is the same as the first deterministic random bit generator.

18 Claims, 5 Drawing Sheets

<u>1</u>

(56) References Cited

U.S. PATENT DOCUMENTS

| | | | | |
|---|---|---|---|---|
| 2010/0008510 A1* | 1/2010 | Zayas | .................. | G06F 21/572 |
| | | | | 713/193 |
| 2015/0178068 A1* | 6/2015 | Kim | ..................... | G06F 21/572 |
| | | | | 717/170 |
| 2017/0295016 A1* | 10/2017 | Revell | .................. | H04L 9/0869 |
| 2019/0056925 A1* | 2/2019 | Komano | ............. | H04L 41/0866 |
| 2019/0243634 A1* | 8/2019 | Lewis | .................... | G06F 8/654 |
| 2019/0250822 A1 | 8/2019 | Choi | | |
| 2021/0397441 A1* | 12/2021 | He | .......................... | G06F 21/64 |
| 2021/0409383 A1* | 12/2021 | Jung | .................... | H04L 9/0869 |
| 2022/0284113 A1* | 9/2022 | Nelson | ............... | G06F 21/6209 |
| 2022/0350890 A1* | 11/2022 | Chang | .................. | H04L 9/3236 |
| 2023/0244469 A1* | 8/2023 | Hajdu | .................... | G06F 11/08 |
| | | | | 717/168 |

FOREIGN PATENT DOCUMENTS

| | | | |
|---|---|---|---|
| TW | 202131176 A | 8/2021 |
| TW | 202132983 A | 9/2021 |

* cited by examiner

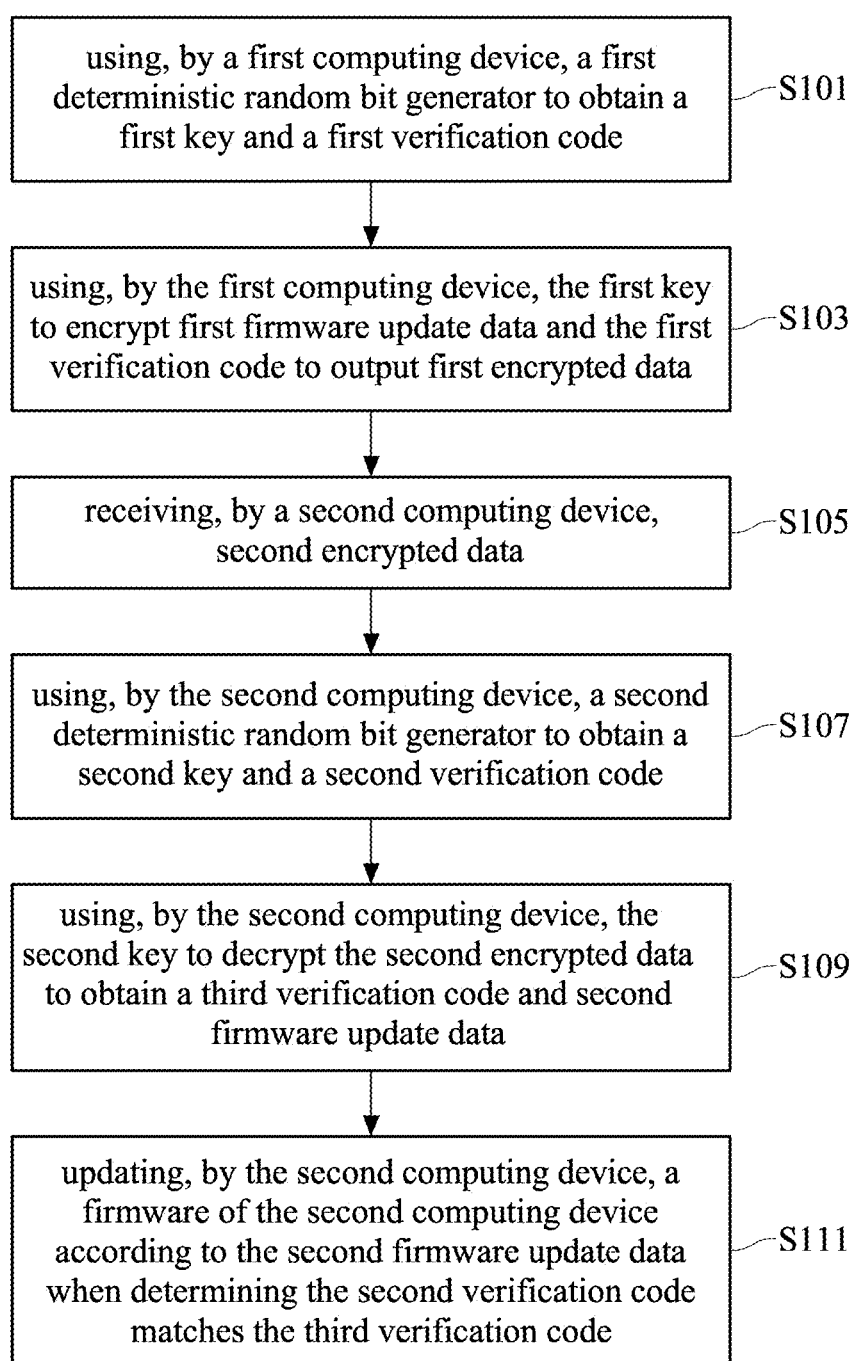

using, by a first computing device, a first deterministic random bit generator to obtain a first key and a first verification code ⌐S101 using, by the first computing device, the first key to encrypt first firmware update data and the first verification code to output first encrypted data ⌐S103 receiving, by a second computing device, second encrypted data ⌐S105 using, by the second computing device, a second deterministic random bit generator to obtain a second key and a second verification code ⌐S107 using, by the second computing device, the second key to decrypt the second encrypted data to obtain a third verification code and second firmware update data ⌐S109 updating, by the second computing device, a firmware of the second computing device according to the second firmware update data when determining the second verification code matches the third verification code ⌐S111

FIG. 2

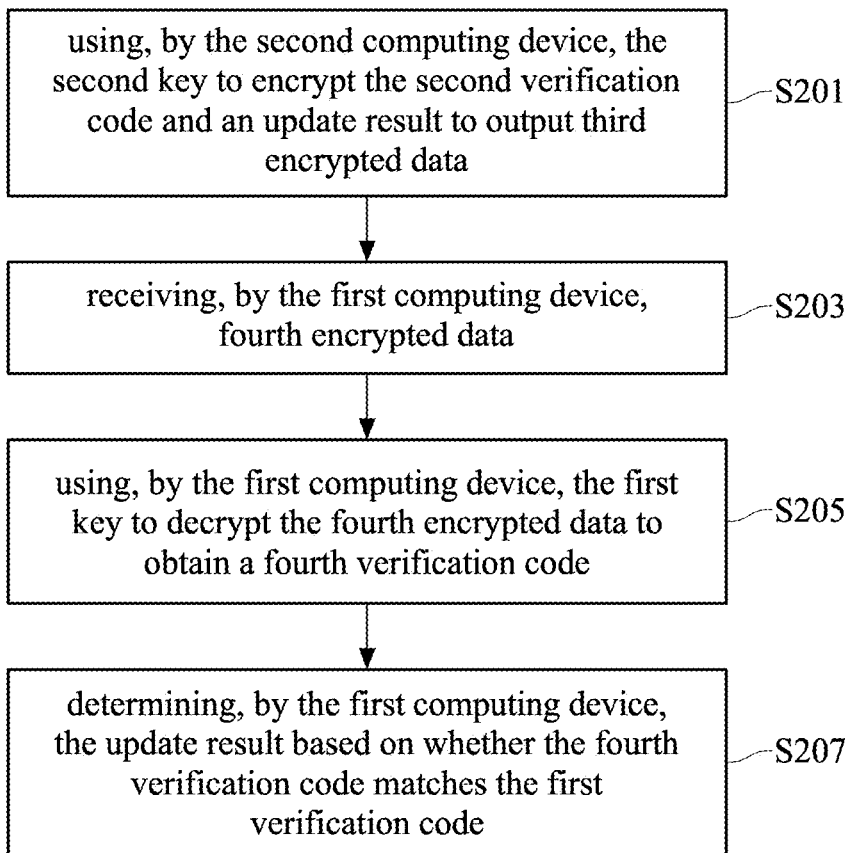

using, by the second computing device, the second key to encrypt the second verification code and an update result to output third encrypted data —S201 receiving, by the first computing device, fourth encrypted data —S203 using, by the first computing device, the first key to decrypt the fourth encrypted data to obtain a fourth verification code —S205 determining, by the first computing device, the update result based on whether the fourth verification code matches the first verification code —S207

FIG. 3

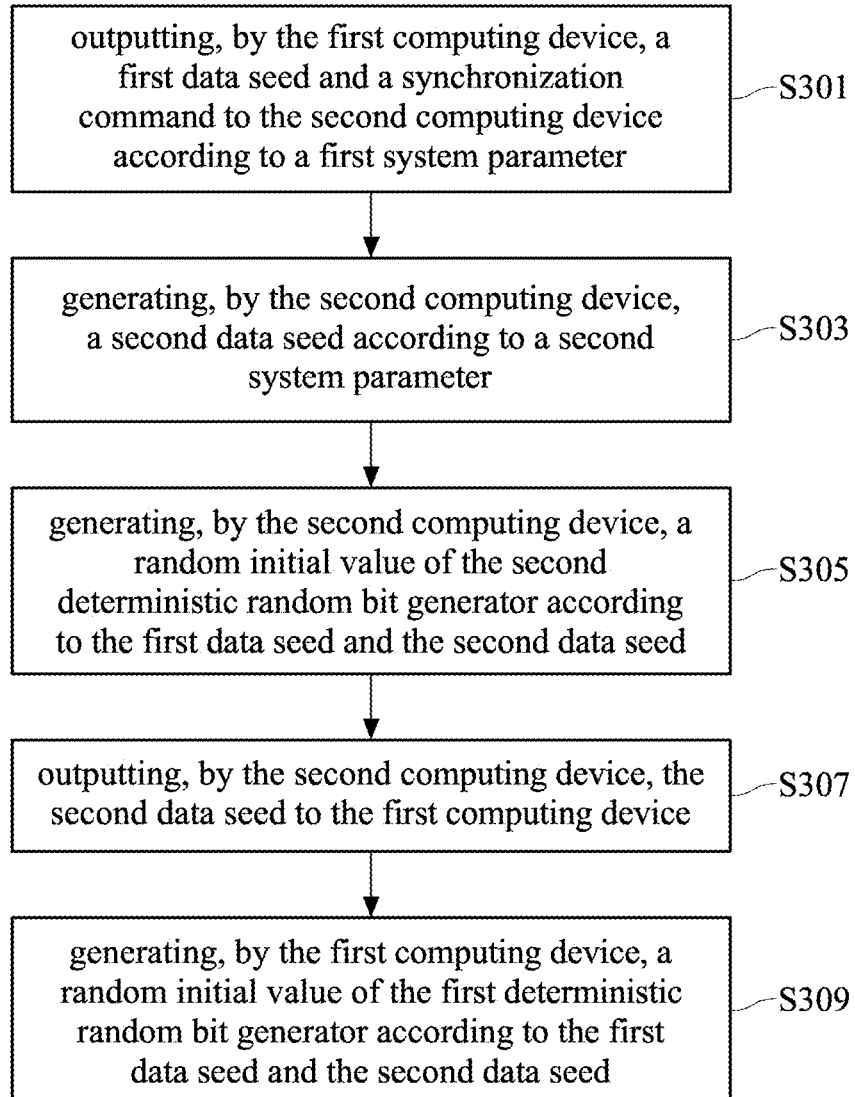

outputting, by the first computing device, a first data seed and a synchronization command to the second computing device according to a first system parameter —S301 generating, by the second computing device, a second data seed according to a second system parameter —S303 generating, by the second computing device, a random initial value of the second deterministic random bit generator according to the first data seed and the second data seed —S305 outputting, by the second computing device, the second data seed to the first computing device —S307 generating, by the first computing device, a random initial value of the first deterministic random bit generator according to the first data seed and the second data seed —S309

FIG. 4

FIRMWARE UPDATE METHOD AND SYSTEM

CROSS-REFERENCE TO RELATED APPLICATIONS

This non-provisional application claims priority under 35 U.S.C. § 119(a) on Patent Application No(s). 113109216 filed in Republic of China (Taiwan) on Mar. 13, 2024, the entire contents of which are hereby incorporated by reference.

BACKGROUND

1. Technical Field

This disclosure relates to a firmware update method and system.

2. Related Art

The security of firmware updates is increasingly being emphasized, with industries such as gaming and automotive placing significant importance on the security of microcontroller firmware (FW) updates. If software update tool is used to update the firmware of the microcontroller, but there is no desire for the firmware of the microcontroller to be tampered with or altered, then only approved firmware update tool can be used to update the microcontroller's firmware.

However, if the computational capability of the microcontroller is insufficient and the software update tool employs complex encryption logic to encrypt the firmware update file, then higher-level microcontroller is required or the microcontroller may need more time to successfully decrypt the firmware update file.

SUMMARY

Accordingly, this disclosure provides a firmware update method and system.

According to one or more embodiment of this disclosure, a firmware update method includes: using, by a first computing device, a first deterministic random bit generator to obtain a first key and a first verification code; using, by the first computing device, the first key to encrypt first firmware update data and the first verification code to output first encrypted data; receiving, by a second computing device, second encrypted data; using, by the second computing device, a second deterministic random bit generator to obtain a second key and a second verification code, wherein the second deterministic random bit generator is the same as the first deterministic random bit generator; using, by the second computing device, the second key to decrypt the second encrypted data to obtain a third verification code and second firmware update data; and updating, by the second computing device, a firmware of the second computing device according to the second firmware update data when determining the second verification code matches the third verification code.

According to one or more embodiment of this disclosure, a firmware update system includes: a first computing device and a second computing device. The first computing device includes a first deterministic random bit generator. The second computing device includes a second deterministic random bit generator and a firmware, and the second computing device is connected to the first computing device. The first computing device is configured to use the first deterministic random bit generator to obtain a first key and a first verification code, and use the first key to encrypt first firmware update data and the first verification code to output first encrypted data. The second computing device is configured to receive second encrypted data, use the second deterministic random bit generator to obtain a second key and a second verification code, use the second key to decrypt the second encrypted data to obtain a third verification code and second firmware update data, and update the firmware of the second computing device according to the second firmware update data when determining the second verification code matches the third verification code, wherein the second deterministic random bit generator is the same as the first deterministic random bit generator.

In view of the above description, the firmware update method and system according to one or more embodiments above may be applied to the second computing device with lower computational capability (for example, microcontroller), which allows the second computing device with lower computational capability to be able to implement security verification. The firmware update method and system according to one or more embodiments above only allows the verified first computing device to update the firmware of the second computing device, and avoids accidental transmission of update command that could damage the firmware. Further, the second computing device may decrypt update data without consuming excessive time.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 2 is a flowchart illustrating a firmware update method according to an embodiment of the present disclosure;

FIG. 3 is a flowchart illustrating determining update result according to an embodiment of the present disclosure;

FIG. 4 is a flowchart illustrating synchronizing deterministic random bit generators according to an embodiment of the present disclosure.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
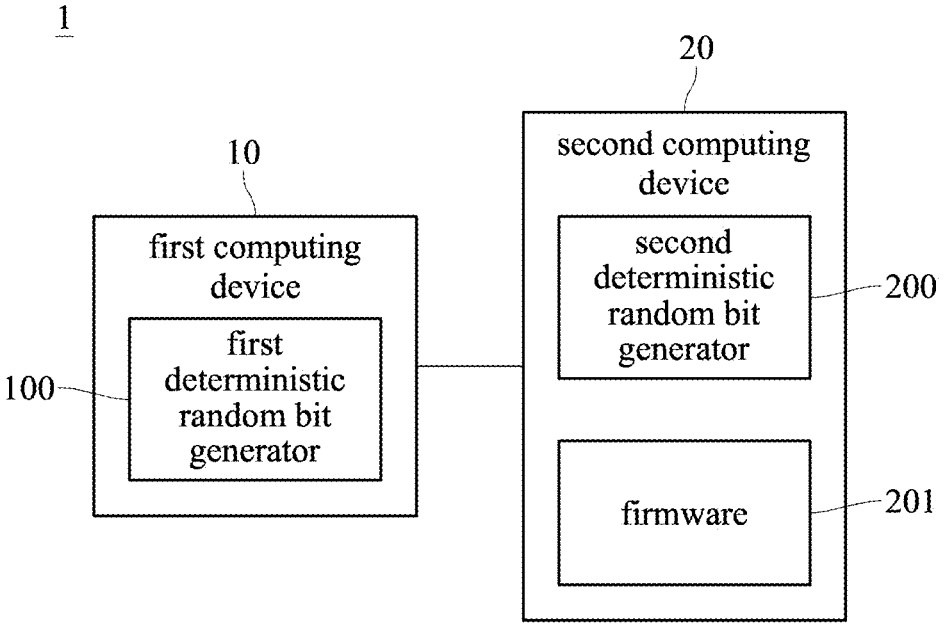
FIG. 1 is a block diagram illustrating a firmware update system according to an embodiment of the present disclosure.

Please refer to FIG. 1, wherein FIG. 1 is a block diagram illustrating a firmware update system according to an embodiment of the present disclosure. As shown in FIG. 1, the firmware update system 1 includes a first computing device 10 and a second computing device 20. The first computing device 10 is in communication with or electrically connected to the second computing device 20. For example, the first computing device 10 and the second computing device 20 may be connected to each other through at least one of an inter-integrated circuit (I2C) interface, a universal asynchronous receiver/transmitter (UART), a universal serial bus (USB), a controller area network (CAN), a secure digital input and output (SDIO), Ethernet and a serial peripheral interface bus (SPI).

The first computing device 10 includes a first deterministic random bit generator (DRBG) 100. The first deterministic random bit generator 100 generates a first key used for performing encrypting and decrypting, and generates a first verification code used for verification. The first computing device 10 is, for example, a host or a firmware update tool. The first computing device 10 may include one or more processors, the processor is, for example, a central processing unit, a graphic process unit (GPU), a microprocessor, a programmable logic controller or any other processor with signal processing function.

The second computing device 20 includes a second deterministic random bit generator 200 and a firmware 201. The second deterministic random bit generator 200 generates a second key used for performing encrypting and decrypting, and generates a second verification code used for verification. The firmware 201 is a to-be-updated firmware of the second computing device 20. The second computing device 20 is, for example, a microcontroller.

It should be noted that, the verification codes generated by the deterministic random bit generators are not cyclic redundancy check (CRC) codes, but encrypted data described below may contain CRC code to verify the correctness of the data.

Please refer to FIG. 1 and FIG. 2, wherein FIG. 2 is a flowchart illustrating a firmware update method according to an embodiment of the present disclosure. As shown in FIG. 2, the firmware update method includes: step S101: using, by a first computing device, a first deterministic random bit generator to obtain a first key and a first verification code; step S103: using, by the first computing device, the first key to encrypt first firmware update data and the first verification code to output first encrypted data; step S105: receiving, by a second computing device, second encrypted data; step S107: using, by the second computing device, a second deterministic random bit generator to obtain a second key and a second verification code; step S109: using, by the second computing device, the second key to decrypt the second encrypted data to obtain a third verification code and second firmware update data; and step S111: updating, by the second computing device, a firmware of the second computing device according to the second firmware update data when determining the second verification code matches the third verification code.

In step S101, the first computing device 10 calculates the first key according to the random initial value and the default calculation equation, and calculates the first verification code according to the first key and the default calculation equation. For example, the default calculation equation may be equation (1) shown below. In equation (1), A1 serves as the random initial value to generate A2 as the first key; then, A1 is changed to the first key to generate A2 as the first verification code.

$$A2 = A1 * 1122334455 + 66778899 \qquad \text{equation (1)}$$

It should be noted that the above uses equation (1) as an example. When the computational capability of the second computing device 20 is insufficient, a default calculation equation with lower complexity may be designed; and when the protection to the firmware 201 should be enhanced, a default calculation equation with higher complexity may be designed.

Further, the first computing device 10 may use a first random initial value as a seed of the first deterministic random bit generator 100 to generate a first number sequence and use one of the number among the first number sequence as the first key, and use another number among the first number sequence as the first verification code. Similar to the content described above, when the first computing device 10 and the second computing device 20 have lower computational capability, the first deterministic random bit generator 100 may have lower bit count; when the protection to the firmware 201 should be enhanced, the first deterministic random bit generator 100 may have higher bit count.

In step S103, the first computing device 10 uses the first key to encrypt the first firmware update data and the first verification code to output the first encrypted data, wherein the first firmware update data may include at least one of an update command and a firmware update file. In other words, the first encrypted data includes the encrypted first firmware update data and the encrypted first verification code.

In step S105, the second computing device 20 receives the second encrypted data. In step S107, the second computing device 20 uses the second deterministic random bit generator 200 to obtain the second key and the second verification code, wherein the second deterministic random bit generator 200 and the first deterministic random bit generator 100 are the same. The second computing device 20 may use the second random initial value as the seed of the second deterministic random bit generator 200 to generate the second number sequence, use a first number among the second number sequence as the second key, and use a second number among the second number sequence as the second verification code. Further, the first random initial value may be the same as the second random initial value, and an order of the first number and the second number among the first number sequence in the first number sequence may be the same as an order of the first number and the second number among the second number sequence in the second number sequence. In other words, when the first deterministic random bit generator 100 and the second deterministic random bit generator 200 are predefined as using the numbers with the same order in the number sequences, the first deterministic random bit generator 100 and the second deterministic random bit generator 200 may generate the keys and the verification codes by using the same random initial value and the same order.

It should be noted that FIG. 1 illustrates step S105 to be performed prior to step S107 (meaning the reception of the second encrypted data may be regarded as a trigger of the second computing device 20 performing step S107), but the second computing device 20 may also first perform step S107 then perform step S105, or perform step S105 and step S107 at the same time.

In step S109, the second computing device 20 uses the second key to decrypt the second encrypted data received in step S105 to obtain the third verification code and the second firmware update data.

In step S111, the second computing device 20 determines whether the second verification code and the third verification code are the same. When the second verification code and the third verification code are the same, it means that the second encrypted data comes from the first computing device 10, the first key and the second key are the same key, and the first verification code is the third verification code. Therefore, the second computing device 20 may update the firmware 201 of the second computing device 20 according to the second firmware update data (i.e. the first firmware update data).

On the contrary, when the second verification code and the third verification code are not the same, it means that the second encrypted data might not come from the first computing device 10 and/or the first key and the second key are different keys. Therefore, the second computing device 20 may deny updating the firmware 201 according to the second firmware update data corresponding to the third verification code.

Accordingly, the firmware update method and system according to one or more embodiments above may be applied to the second computing device with lower computational capability (for example, microcontroller), which allows the second computing device with lower computational capability to be able to implement security verification. The firmware update method and system according to one or more embodiments above only allows the verified first computing device to update the firmware of the second computing device, and avoids accidental transmission of update command that could damage the firmware. Further, the second computing device may decrypt update data without consuming excessive time.

Please refer to FIG. 1 and FIG. 3, wherein FIG. 3 is a flowchart illustrating determining update result according to an embodiment of the present disclosure. Steps shown in FIG. 3 may be performed after step S111 of FIG. 2. As shown in FIG. 3, determining the update result may include: step S201: using, by the second computing device, the second key to encrypt the second verification code and an update result to output third encrypted data; step S203: receiving, by the first computing device, fourth encrypted data; step S205: using, by the first computing device, the first key to decrypt the fourth encrypted data to obtain a fourth verification code; and step S207: determining, by the first computing device, the update result based on whether the fourth verification code matches the first verification code.

In step S201, the second computing device 20 uses the second key to encrypt the second verification code and the update result of the firmware 201 to generate and output the third encrypted data. The update result may include one or more of the part of the firmware 201 that is updated, update time and the storage location of the firmware 201, the present disclosure does not limit the content of the update result.

In step S203, the first computing device 10 receives the fourth encrypted data. In step S205, the first computing device 10 uses the first key to decrypt the fourth encrypted data received in step S203 to obtain the fourth verification code.

In step S207, the first computing device 10 may determine whether the first verification code and the fourth verification code are the same. When the first verification code and the fourth verification code are the same, it means that the third encrypted data comes from the second computing device 20. Therefore, the first computing device 10 may determine that the update result of updating the firmware 201 using the first firmware update data is successful. On the contrary, when the first verification code and the fourth verification code are not the same, the first computing device 10 may accordingly determine that the update result of updating the firmware 201 using the first firmware update data is unsuccessful.

Please refer to FIG. 1 and FIG. 4, wherein FIG. 4 is a flowchart illustrating synchronizing deterministic random bit generators according to an embodiment of the present disclosure. Steps shown in FIG. 4 may be performed before step S101 of FIG. 2. That is, FIG. 4 may be regarded as a stage of synchronizing the first deterministic random bit generator 100 and the second deterministic random bit generator 200 before using the first deterministic random bit generator 100 and the second deterministic random bit generator 200 to perform the verification and updating the firmware 201. Further, steps shown in FIG. 4 may be performed each time before the first computing device 10 updating the firmware 201. As shown in FIG. 4, the synchronization of the deterministic random bit generators includes: step S301: outputting, by the first computing device, a first data seed and a synchronization command to the second computing device according to a first system parameter; step S303: generating, by the second computing device, a second data seed according to a second system parameter; step S305: generating, by the second computing device, a random initial value of the second deterministic random bit generator according to the first data seed and the second data seed; step S307: outputting, by the second computing device, the second data seed to the first computing device; and step S309: generating, by the first computing device, a random initial value of the first deterministic random bit generator according to the first data seed and the second data seed. It should be noted that step S307 may be performed before step S305, or step S307 and step S305 may be performed at the same time.

In step S301, the first computing device 10 outputs the first data seed and the synchronization command to the second computing device 20 according to the first system parameter. The first system parameter may include at least one of a current timestamp counter of the first computing device 10 and a voltage value of the alternating current (AC) etc. input to the first computing device 10. In addition, when the first computing device 10 includes multiple deterministic random bit generators, the first system parameter may also be a combination of random numbers generated by the deterministic random bit generators, the present disclosure does not limit the content of the first system parameter. In an embodiment, the first computing device 10 may use the first system parameter as the first data seed. In another embodiment, the first computing device 10 may encrypt the first system parameter to generate the first data seed, wherein the first data seed may be implemented in the form of verification code. The synchronization command may be used to instruct the second computing device 20 to start the synchronization of the deterministic random bit generators.

In step S303, the second computing device 20 generates the second data seed according to the second system parameter. The second system parameter may include at least one of a current timestamp counter of the second computing device 20 and a voltage value of the alternating current (AC) etc. input to the second computing device 20. In addition, when the second computing device 20 includes multiple deterministic random bit generators, the second system parameter may also be a combination of random numbers generated by the deterministic random bit generators, the present disclosure does not limit the content of the second system parameter. The second system parameter may be generated based on the same or different data type as the first system parameter. In an embodiment, the second computing device 20 may use the second system parameter as the second data seed. In another embodiment, the second computing device 20 may encrypt the second system parameter to generate the second data seed, wherein the second data seed may be implemented in the form of verification code. The second computing device 20 may generate the second data seed after receiving the synchronization command.

In step S305, the second computing device 20 generates the second random initial value of the second deterministic random bit generator 200 according to a combination of the first data seed and the second data seed. Further, when the first data seed is generated by encrypting the first system parameter, the second computing device 20 may obtain the first system parameter by decrypting the first data seed, combine the first system parameter and the second data seed, and use the combination of the two as the second random initial value of the second deterministic random bit generator 200. Further, the second computing device 20 may use the combination of the first system parameter and the second system parameter as the second random initial value of the second deterministic random bit generator 200.

In step S307, the second computing device 20 outputs the second data seed to the first computing device 10. Corresponding to step S303, the second computing device 20 may directly use the second system parameter as the second data seed and output the second data seed to the first computing device 10; or, the second computing device 20 may use the encrypted second system parameter as the second data seed and output the second data seed generated from the encryption to the first computing device 10.

In step S309, the first computing device 10 generates the first random initial value of the first deterministic random bit generator 100 according to a combination of the first data seed and the second data seed. Further, when the second data seed is generated by encrypting the second system parameter, the first computing device 10 may obtain the second system parameter by decrypting the second data seed, combine the second system parameter and the first data seed, and use the combination of the two as the first random initial value of the first deterministic random bit generator 100. Further, the first computing device 10 may use the combination of the first system parameter and the second system parameter as the first random initial value of the first deterministic random bit generator 100.

The combination described in step S305 and step S309 may be generated according to a default combination equation, and the default combination equation may be preset in the first computing device 10 and the second computing device 20. For example, the default combination equation may be the first system parameter adding to the second system parameter, subtracting the second system parameter from the first system parameter, multiplying the first system parameter with the second system parameter, or dividing the first system parameter by the second system parameter. The default combination equation described herein is merely an example, the present disclosure is not limited thereto.

In addition, the first key described above is generated according to the first random initial value, and the second key described above is generated according to the second random initial value. Specifically, the first key may be generated by using the first random initial value as the seed of the first deterministic random bit generator 100, and the first verification code may be the second random number generated according to the first key by using the first deterministic random bit generator 100. Similarly, the second key may be generated by using the second random initial value as the seed of the second deterministic random bit generator 200, and the second verification code may be the second random number generated according to the second key by using the second deterministic random bit generator 200.

Before performing the steps shown in FIG. 4, the first computing device 10 and the second computing device 20 may each establish the same deterministic random bit generator (i.e., the first deterministic random bit generator 100 and the second deterministic random bit generator 200), for subsequent utilization in generating random sequences with longer periods but fixed patterns.

Figure 5:
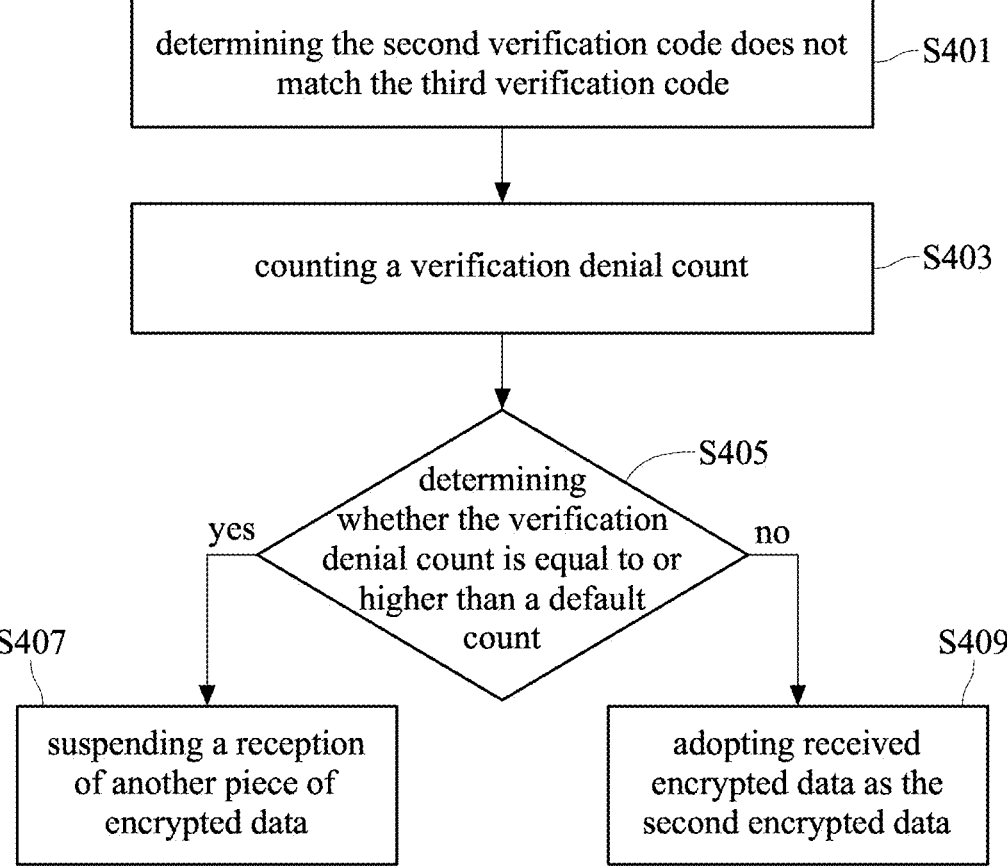
FIG. 5 is a flowchart illustrating a protection mechanism for verification failure according to an embodiment of the present disclosure.

Please refer to FIG. 1 and FIG. 5, wherein FIG. 5 is a flowchart illustrating a protection mechanism for verification failure according to an embodiment of the present disclosure. Steps shown in FIG. 5 may be performed after step S109 of FIG. 2. As shown in FIG. 5, the protection mechanism for unsuccessful verification includes: step S401: determining the second verification code does not match the third verification code; step S403: counting a verification denial count; step S405: determining whether the verification denial count is equal to or higher than a default count; when the determination result of step S405 is "yes", performing step S407: suspending a reception of another piece of encrypted data; and when the determination result of step S405 is "no", performing step S409: adopting received encrypted data as the second encrypted data. Step S401 may be regarded as the determination result of the second computing device 20 determining the second verification code and the third verification code not matching with each other after step S109 in FIG. 2, its details are not repeated herein.

In step S403 and step S405, the second computing device 20 increments the verification denial count by 1 and determines whether the incremented verification denial count is equal to or higher than the default count. The initial value of the verification denial count may be 0. The default count may be, for example, 5, but the present disclosure is not limited thereto.

When the second computing device 20 determines that the verification denial count is equal to or higher than the default count, in step S407, the second computing device 20 may deny updating the firmware 201 according to the second encrypted data and deny receiving another encrypted data. On the contrary, when the second computing device 20 determines that the verification denial count is not equal to and is not higher than the default count, in step S409, the second computing device 20 may receive a new piece of received encrypted data again, and use this piece of received encrypted data as the second encrypted data described in step S105 of FIG. 2, thereby performing the subsequent verification. Further, the second computing device 20 may reset the verification denial count to zero each time the second computing device 20 determines that the second verification code matches the third verification code.

In addition, the second computing device 20 may also increment an update count by 1 each time the second computing device 20 receives the second encrypted data, and when the update count equals or exceeds another default count, the second computing device 20 rejects receiving another piece of encrypted data. Said another default count may be, for example, 10, but the present disclosure is not limited thereto. Additionally, the second computing device 20 may reset the update count to zero after a default time duration, where the default time duration may be, for example, 24 hours.

By limiting the number of verification failures and update count, the risk of firmware 201 being accessed by hackers may be reduced.

In addition, during the process of performing any one of the embodiments of FIG. 2, FIG. 3 and FIG. 5, when at least one target device among the first computing device 10 and the second computing device 20 is triggered by a power off signal, said at least one target device may restore the firmware 201 of the second computing device 20 according to a secure version. For example, the firmware 201 may be restored to the previous version. Accordingly, when the first computing device 10 and/or the second computing device 20 experience a power outage during the update process, the impact of the power outage on the firmware 201 may be reduced.

In view of the above description, the firmware update method and system according to one or more embodiments above may be applied to the second computing device with lower computational capability (for example, microcontroller), which allows the second computing device with lower computational capability to be able to implement security verification. The firmware update method and system according to one or more embodiments above only allows the verified first computing device to update the firmware of the second computing device, and avoids accidental transmission of update command that could damage the firmware. Further, the second computing device may decrypt update data without consuming excessive time. In addition, by limiting the number of verification failures and update count, the risk of firmware being accessed by hackers may be reduced. Further, by restoring the firmware according to the power off signal, the impact of the power outage on the firmware may be reduced.

What is claimed is:

1. A firmware update method, comprising:

using, by a first computing device, a first deterministic random bit generator to obtain a first key and a first verification code;

using, by the first computing device, the first key to encrypt first firmware update data and the first verification code to output first encrypted data;

receiving, by a second computing device, second encrypted data;

using, by the second computing device, a second deterministic random bit generator to obtain a second key and a second verification code, wherein the second deterministic random bit generator is the same as the first deterministic random bit generator;

using, by the second computing device, the second key to decrypt the second encrypted data to obtain a third verification code and second firmware update data; and updating, by the second computing device, a firmware of the second computing device according to the second firmware update data when determining the second verification code matches the third verification code;

wherein after updating, by the second computing device, the firmware of the second computing device when determining the second verification code matches the third verification code, the method further comprises:

using, by the second computing device, the second key to encrypt the second verification code and an update result to output third encrypted data;

receiving, by the first computing device, fourth encrypted data;

using, by the first computing device, the first key to decrypt the fourth encrypted data to obtain a fourth verification code; and determining, by the first computing device, the update result based on whether the fourth verification code matches the first verification code.

2. The firmware update method according to claim 1, wherein using, by the first computing device, the first deterministic random bit generator to obtain the first key and the first verification code comprises:

using a first random initial value as a seed of the first deterministic random bit generator to generate a first number sequence; and using a first number among the first number sequence as the first key, and using a second number among the first number sequence as the first verification code.

3. The firmware update method according to claim 2, wherein using, by the second computing device, the second deterministic random bit generator to obtain the second key and the second verification code comprises:

using a second random initial value as a seed of the second deterministic random bit generator to generate a second number sequence; and using a first number among the second number sequence as the second key, and using a second number among the second number sequence as the second verification code, wherein the first random initial value is the same as the second random initial value, and an order of the first number and the second number among the first number sequence in the first number sequence is the same as an order of the first number and the second number among the second number sequence in the second number sequence.

4. The firmware update method according to claim 1, wherein using, by the first computing device, the first deterministic random bit generator to obtain the first key and the first verification code comprises:

calculating the first key according to a random initial value and a default calculation equation; and calculating the first verification code according to the first key and the default calculation equation.

5. The firmware update method according to claim 1, further comprising:

outputting, by the first computing device, a first data seed and a synchronization command to the second computing device according to a first system parameter;

generating, by the second computing device, a second data seed according to a second system parameter;

generating, by the second computing device, a random initial value of the second deterministic random bit generator according to the first data seed and the second data seed, wherein the second key is generated according to the random initial value of the second deterministic random bit generator;

outputting, by the second computing device, the second data seed to the first computing device; and generating, by the first computing device, a random initial value of the first deterministic random bit generator according to the first data seed and the second data seed, wherein the first key is generated according to the random initial value of the first deterministic random bit generator.

6. The firmware update method according to claim 5, wherein outputting, by the first computing device, the first data seed and the synchronization command to the second computing device according to the first system parameter comprises:

encrypting, by the first computing device, the first system parameter to generate the first data seed, wherein generating, by the second computing device, the random initial value of the second deterministic random bit generator according to the first data seed and the second data seed comprises:

decrypting, by the second computing device, the first data seed to obtain the first system parameter; and combining the first system parameter and the second data seed as the random initial value of the second deterministic random bit generator.

7. The firmware update method according to claim 5, wherein outputting, by the second computing device, the second data seed to the first computing device comprises:

encrypting, by the second computing device, the second system parameter to generate the second data seed, wherein generating, by the first computing device, the random initial value of the first deterministic random bit generator according to the first data seed and the second data seed comprises:

decrypting, by the first computing device, the second data seed to obtain the second system parameter; and combining the first data seed and the second system parameter as the random initial value of the first deterministic random bit generator.

8. The firmware update method according to claim 1, further comprising:

counting, by the second computing device, a verification denial count when determining the second verification code does not match the third verification;

determining, by the second computing device, whether the verification denial count is equal to or higher than a default count;

suspending, by the second computing device, a reception of another piece of encrypted data when the verification denial count is equal to or higher than the default count; and adopting, by the second computing device, received encrypted data as the second encrypted data when the verification denial count is not equal to or higher than the default count.

9. The firmware update method according to claim 1, further comprising:

when at least one target device among the first computing device and the second computing device is triggered by a power off signal, restoring, by the at least one target device, the firmware of the second computing device according to a secure version.

10. A firmware update system, comprising:

a first computing device comprising a first deterministic random bit generator, the first computing device configured to use the first deterministic random bit generator to obtain a first key and a first verification code, and use the first key to encrypt first firmware update data and the first verification code to output first encrypted data; and a second computing device comprising a second deterministic random bit generator and a firmware, the second computing device connected to the first computing device, the second computing device configured to receive second encrypted data, use the second deterministic random bit generator to obtain a second key and a second verification code, use the second key to decrypt the second encrypted data to obtain a third verification code and second firmware update data, and update the firmware of the second computing device according to the second firmware update data when determining the second verification code matches the third verification code, wherein the second deterministic random bit generator is the same as the first deterministic random bit generator;

wherein after updating the firmware of the second computing device, the second computing device is further configured to use the second key to encrypt the second verification code and an update result to output third encrypted data, the first computing device is further configured to receive fourth encrypted data, use the first key to decrypt the fourth encrypted data to obtain a fourth verification code, and determine the update result based on whether the fourth verification code matches the first verification code.

11. The firmware update system according to claim 10, wherein the first computing device uses a first random initial value as a seed of the first deterministic random bit generator to generate a first number sequence, uses a first number among the first number sequence as the first key, and uses a second number among the first number sequence as the first verification code.

12. The firmware update system according to claim 11, wherein the second computing device uses a second random initial value as a seed of the second deterministic random bit generator to generate a second number sequence, uses a first number among the second number sequence as the second key, and uses a second number among the second number sequence as the second verification code, wherein the first random initial value is the same as the second random initial value, and an order of the first number and the second number among the first number sequence in the first number sequence is the same as an order of the first number and the second number among the second number sequence in the second number sequence.

13. The firmware update system according to claim 10, wherein the first computing device calculates the first key according to a random initial value and a default calculation equation, and calculates the first verification code according to the first key and the default calculation equation.

14. The firmware update system according to claim 10, wherein the first computing device is further configured to output a first data seed and a synchronization command to the second computing device according to a first system parameter, and generate a random initial value of the first deterministic random bit generator according to the first data seed and a second data seed, the second computing device is further configured to generate the second data seed according to a second system parameter, generate a random initial value of the second deterministic random bit generator according to the first data seed and the second data seed, and output the second data seed to the first computing device, wherein the first key is generated according to the random initial value of the first deterministic random bit generator, and the second key is generated according to the random initial value of the second deterministic random bit generator.

15. The firmware update system according to claim 14, wherein the first computing device encrypts the first system parameter to generate the first data seed, the second computing device decrypts the first data seed to obtain the first system parameter, and combines the first system parameter and the second data seed as the random initial value of the second deterministic random bit generator.

16. The firmware update system according to claim 14, wherein the second computing device encrypts the second system parameter to generate the second data seed, the first computing device decrypts the second data seed to obtain the second system parameter, and combines the first data seed and the second system parameter as the random initial value of the first deterministic random bit generator.

17. The firmware update system according to claim 10, wherein when determining the second verification code does not match the third verification, the second computing device is further configured to count a verification denial count, suspend a reception of another piece of encrypted data when determining the verification denial count is equal to or higher than a default count, and adopt received encrypted data as the second encrypted data when determining the verification denial count is not equal to or higher than a default count.

18. The firmware update system according to claim 10, wherein when at least one target device among the first computing device and the second computing device is triggered by a power off signal, the at least one target device is configured to restore the firmware of the second computing device according to a secure version.

\* \* \* \* \*